US011831773B1

(12) United States Patent
Sadras Sudhakar et al.

(10) Patent No.: US 11,831,773 B1
(45) Date of Patent: Nov. 28, 2023

(54) SECURED DATABASE RESTORATION ACROSS SERVICE REGIONS

(71) Applicant: Amazon Technologies, Inc., Seattle, WA (US)

(72) Inventors: Uma Ganesh Sadras Sudhakar, Seattle, WA (US); Chase Kernan, Seattle, WA (US); Divyank Duvedi, Seattle, WA (US); Mohammed Noman Mulla, Seattle, WA (US); Conor P Cahill, Waterford, VA (US)

(73) Assignee: Amazon Technologies, Inc., Seattle, WA (US)

( * ) Notice: Subject to any disclaimer, the term of this patent is extended or adjusted under 35 U.S.C. 154(b) by 475 days.

(21) Appl. No.: 16/915,950

(22) Filed: Jun. 29, 2020

(51) Int. Cl.
| | | |
|---|---|---|
| *H04L 29/08* | (2006.01) | |
| *H04L 9/32* | (2006.01) | |
| *G06F 11/14* | (2006.01) | |
| *H04L 9/40* | (2022.01) | |
| *G06F 9/54* | (2006.01) | |
| *H04L 9/08* | (2006.01) | |
| *G06F 21/62* | (2013.01) | |

(52) U.S. Cl.
CPC ............ *H04L 9/3213* (2013.01); *G06F 9/547* (2013.01); *G06F 11/1464* (2013.01); *G06F 11/1469* (2013.01); *G06F 21/6218* (2013.01); *H04L 9/0822* (2013.01); *H04L 63/0853* (2013.01); *H04L 63/10* (2013.01); *G06F 2201/80* (2013.01)

(58) Field of Classification Search
CPC . H04L 9/3213; H04L 9/0822; H04L 63/0853; H04L 63/10; G06F 9/547; G06F 11/1464; G06F 11/1469; G06F 21/6218; G06F 2201/80

USPC .......................................................... 726/19
See application file for complete search history.

(56) References Cited

U.S. PATENT DOCUMENTS

| | | |
|---|---|---|
| 8,769,049 B2 | 7/2014 | Murphy et al. |
| 8,805,953 B2 | 8/2014 | Murphy et al. |
| 9,171,008 B2 | 10/2015 | Prahlad et al. |
| 9,977,912 B1 * | 5/2018 | Kandamuthan ......... G06F 21/44 |
| 10,162,528 B2 | 12/2018 | Sancheti et al. |
| 2016/0371145 A1 | 12/2016 | Akutsu et al. |
| 2020/0195719 A1 * | 6/2020 | Mehta ................. H04L 67/1097 |

* cited by examiner

*Primary Examiner* — Jeffrey C Pwu
*Assistant Examiner* — Nega Woldemariam
(74) *Attorney, Agent, or Firm* — Robert C. Kowert; Kowert, Hood, Munyon, Rankin & Goetzel P.C.

(57) ABSTRACT

A system for database restoration across service regions. The system includes data storage and backup data storage in the first region. The system includes a frontend for the database service configured to receive, from a client, a request to restore a database to the first region from backups stored in another backup data storage in a second region and to receive an authentication token for the request from the client. The system also includes a backup restore manager service for the first region configured to send, to another backup restore manager service implemented in the second region, a credential request for a second region credential authorizing retrieval of the one or more other backups from the second region. The backup restore manager service sends a backup restore request to retrieve the backups from the other backup data storage and loads the backups to restore the database in the first region.

20 Claims, 8 Drawing Sheets

SECURED DATABASE RESTORATION ACROSS SERVICE REGIONS

BACKGROUND

Database systems store data in data stores on behalf of clients. Backups for the database systems allow the clients to ensure that their data is safe in the event of data loss or mishandling. Databases may be restored to a previous state based on stored backups managed by the database systems. The backups may be stored in a backup data store adjacent to the databases in the data stores. Other backups may be stored off-site, such as at another storage device in another location.

Distributed systems may include geographically distributed computing resources that provide computer services on a regional basis. The different regions for the distributed computing resources may be insulated such that each region may have different data objects stored at respective data storage systems. Opening the regional systems to outside connections may introduce security concerns when the regional systems are insecure in which service calls may be processed by services implemented by the regional systems.

Figure 1:
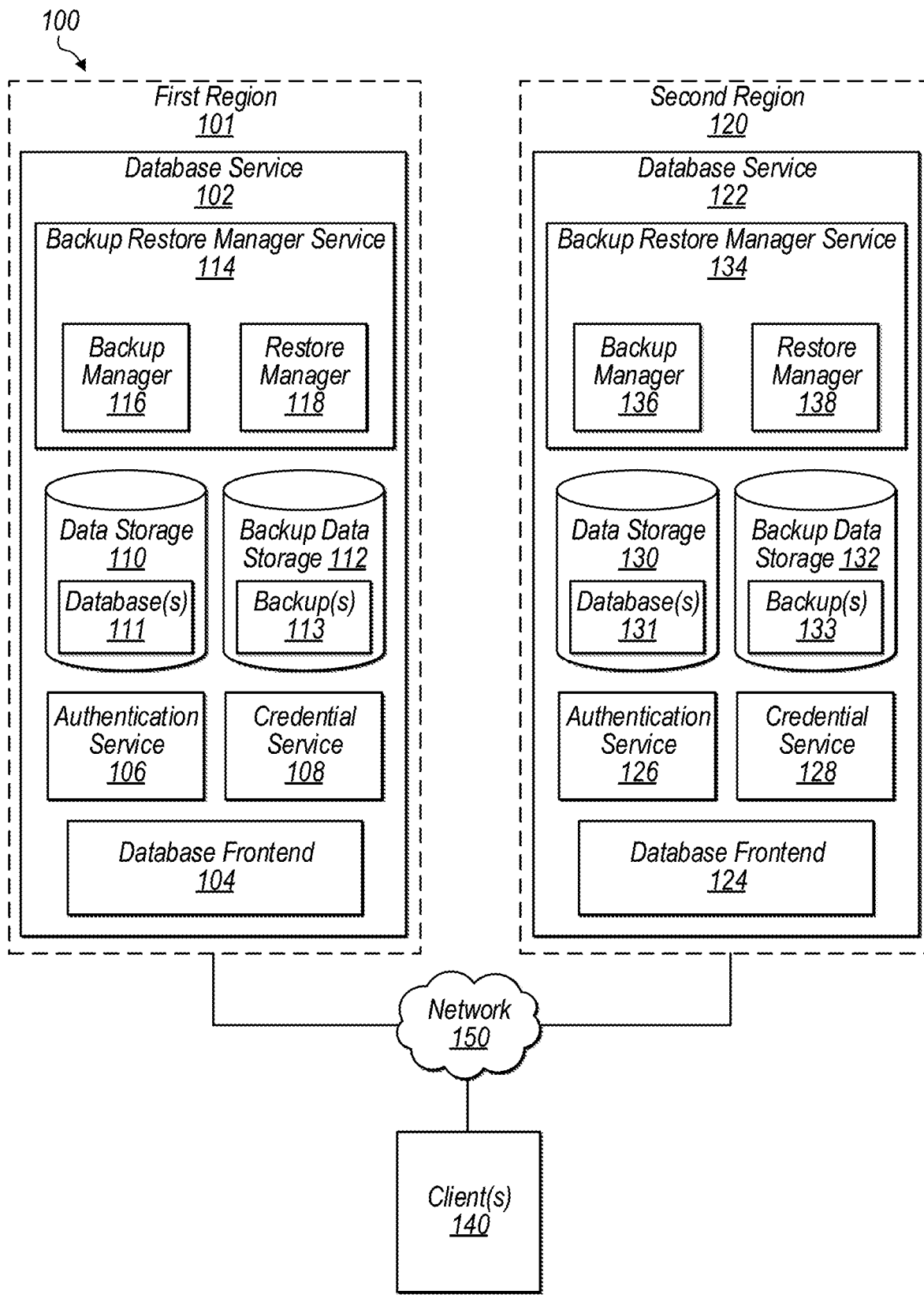
FIG. 1 is a block diagram for a data storage system to manage database backups across multiple regions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for secured database restorations across regions are disclosed. Distributed database systems may include data storage centers distributed across multiple regions. Each of the regions may have different quantities of data stored thereon such that data may not necessarily be synchronized between the regions. In some situations, data stored on a first region may be sought to be transferred to a second region. In the case of data restoration, data may be restored from a source region to a destination region. As a default behavior, each of the regions may initially restrict access for service calls that originate from outside of the region receiving the service calls.

A forward access session token may be provided to the destination region indicate that service calls initiated on behalf of a client are authorized by or for the client. The forward access session token may be used to obtain a credential from the source region that authorizes service calls that originate from outside of the source region. Data from the source region may be obtained using the credential from the source region. The obtained data may then be stored to the destination region in order to successfully complete database restoration across regions of the distributed system.

In one aspect of the invention, a system for cross-region database restorations is disclosed. The system includes data storage in a first region for a database service configured to store a plurality of database objects. The system also includes a backup data storage in the first region configured to store one or more backups of the individual ones of the database objects. The system further includes one or more computing devices comprising one or more processors and memory and configured to implement a frontend for the database service. The frontend may be configured to receive, from a client in accordance with an application programmatic interface (API), a request to restore a database to the first region from one or more other backups stored in another backup data storage implemented in a second region. The frontend may also request and receive, from an authentication service, an authentication token for the request from the client. The system includes one or more computing devices comprising one or more processors and memory and configured to implement a backup restore manager service for the first region. The backup restore manager service for the first region may be configured to perform backup operations to store the one or more backups of individual ones of the database objects to the backup data storage in the first region. The backup restore manager service for the first region may also send, to another backup restore manager service implemented in the second region, a credential request for a second region credential authorizing the backup restore manager service to retrieve the one or more other backups from the second region, where the credential request is generated using the authentication token. The backup restore manager service for the first region may receive, from the other backup restore manager service, the second region credential. The backup restore manager service for the first region may send, to the other backup data storage in the second region, a backup restore request to retrieve the one or more other backups from the other backup data storage in the second region, wherein the backup restore request is generated using the second region credential. The backup restore manager service for the first region may load the one or more backups from the second region to restore the database.

In another aspect of the invention, a method for cross-region database restoration is disclosed. The method includes receiving, from a client of a database service in accordance with an application programmatic interface (API), a request to restore a database to data storage of a first region from one or more backups stored in a backup data storage implemented in a second region. The method also includes requesting and receiving, from an authentication service, an authentication token for the request from the client. The method further includes sending, from a backup restore manager service implemented in the first region to another backup restore manager service implemented in the second region, a credential request for a second region credential authorizing the backup restore manager service to retrieve the one or more backups from the second region, wherein the credential request is generated using the authentication token. The method also includes receiving, from the other backup restore manager service, the second region credential. The method includes sending, to the backup data storage in the second region, a backup restore request to retrieve the one or more backups from the backup data storage in the second region, wherein the backup restore request is generated using the second region credential. The method also includes loading the one or more backups from the second region to restore the database.

In yet another aspect of the invention, one or more computer-readable storage media that stores instructions are disclosed. The instructions, when executed on or across one or more processors, cause the one or more processors to in response to a request, received from a client of a database service in accordance with an application programmatic interface (API), to restore a database to a first region from one or more backups stored in a backup data storage implemented in a second region, request, from an authentication service, an authentication token for the request from the client. The instructions further cause the one or more processors to send, from a backup restore manager service implemented in the first region to another backup restore manager service implemented in the second region, a credential request for a second region credential authorizing the backup restore manager service to retrieve the one or more backups from the second region, wherein the credential request is generated using the authentication token. The instructions also cause the one or more processors to send, to the backup data storage in the second region, a backup restore request to retrieve the one or more backups from the backup data storage in the second region, wherein the backup restore request is generated using the second region credential. The instructions further cause the one or more processors to load the one or more backups from the second region to restore the database.

FIG. 1 illustrates a data storage system 100, according to some embodiments. The data storage system 100 may include a plurality of data centers located in a plurality of regions. The data centers may be accessible to one or more clients 140 via a network 150. The network 150 may include an Internet connection, an intranet connection, a local network connection, or other suitable network connection type. For example, the data storage system 100 may be configured to provide access to a given data center based on a geographic region of clients with respect to the given data center. In some embodiments, the plurality of regions may correspond to respective geographic regions. For example, a first region of the plurality of regions may correspond to a first country, such as the United States, and a second region of the plurality of regions may correspond to a second country, such as the United Kingdom. In other embodiments, countries may be subdivided into additional regions. For example, the United States may be represented by multiple regions, such as north, west, east, and south regions. Other regions may include multiple countries, such as regions covering eastern Europe or western Europe. In some embodiments, the first region 101 may be communicatively coupled to the second region 120 via a backend connection via the network 150.

The data storage system 100 may include first region 101 and second region 120, according to some embodiments. In some embodiments, the first region 101 and the second region 120 may be implemented as part of a provider network. The first region 101 and the second region 120 may include respective computing devices configured to provide various services. The first region 101 may include computing devices to implement a database service 102 including a database frontend 104, an authentication service 106, a credential service 108, data storage 110, backup data storage 112, and a backup restore manager service 114. The backup restore manager service 114 may include computing devices configured to a backup manager 116 and a restore manager 118.

The second region 120 may include computing devices to implement a database service 122 including a database frontend 124, an authentication service 126, a credential service 128, data storage 130, backup data storage 132, and a backup restore manager service 134. The backup restore manager service 134 may include computing devices configured to a backup manager 136 and a restore manager 138. The client 140 may store data in a database 111 managed at the data storage 110, according to some embodiments. The data storage 110 may also provide data storage for multiple clients 140. The database 111 may include data and metadata and other data objects. In some embodiments, the backup restore manager service 114 may be configured to manage backup data for the data storage 110. For example, the backup restore manager service 114 may be configured to maintain and manage backups 113 in the backup data storage 112 for the database 111. The backups 113 may include differential backups, point-in-time backups, snapshot backups, clone backups, or other data retention types. The backup restore manager service 114 may include a backup manager 116 configured to generate and store backups 113 to the backup data storage 112. The backup restore manager service 114 may include a restore manager 118 configured to restore the backups 113 to the databases 111 maintained in the data storage 110. In some embodiments, the client 140 may send a request to a frontend for the first region 101, such as the frontend 104, for data restoration of the database 111. For example, the client 140 may send a request to the frontend 104 indicating a target data object to be restored and a source data object or source location for data objects, such as backups 113.

The request may indicate that data restoration may require data stored in a different region from the first region 101. For example, the request may indicate that the source data object or the source location is located in the second region 120. In other words, the request may indicate that the client 140 is requesting a cross-region restoration of data. As such, the second region 120 may store the required data as backups 133 in backup data storage 132.

The frontend 104 may request an authentication token from the authentication service 106, according to some embodiments. The authentication token may alternatively be referred to as a forward access session token. The authentication service 106 may generate an authentication token that permits various services in the data storage system 100 to execute service calls on behalf of the client 140. For example, service calls may be signed in accordance with the authentication token or include the authentication as part of the service calls in order to indicate that the services are authorized to execute service calls on behalf of the client 140. The authentication service 106 may send the authentication token to the frontend 104 in response to the request for the authentication token. In some embodiments, the authentication token may be passed between the services in order to have downstream services perform additional service calls on behalf of the client 140. In some embodiments, the authentication service 106 may encrypt the authentication token in accordance with an encryption key provided by a credential service 108. In other embodiments, the authentication token may be unencrypted when sent to the frontend 104.

The frontend 104 may send a request for data restoration to the backup restore manager service 114, according to some embodiments. The request for data restoration may include For example, the frontend 104 may indicate to the to the backup restore manager service 114 that the client 140 has requested that portions of the database 111 be restored with backups 133 stored in the second region 120. In some embodiments, the frontend 104 may send the authentication token to the backup restore manager service 114. For example, the request for data restoration may include the authentication token. In another example, the authentication token may be sent in a separate transmission. The authentication token may be encrypted prior to being sent to the backup restore manager service 114. For example, the authentication token may be encrypted by the frontend 104 in accordance with an encryption key provided by the key management service 107.

The backup restore manager service 114 may identify a source location based on information included in the request for data restoration from the frontend 104, according to some embodiments. For example, the backup restore manager service 114 may identify that the second region 120 is the source location indicated in the request for data restoration. Based on identification of the second region 120, the backup restore manager service 114 may send a manifest request for metadata to a backup restore manager service 134 of the second region 120. For example, the backup restore manager service 114 may send, as part of the manifest request, an indication of the client 140, an indication of the requested backups 133, and security information derived from the authentication token. The backup restore manager service 114 may send the manifest request to the backup restore manager service 134 of the second region 120 for information relating to the backups 133 for restoration of the database 111, according to some embodiments. For example, the backup restore manager service 114 may request manifest information indicating locations for obtaining the backups 133 from the second region 120.

The backup restore manager service 134 may receive the manifest request from the backup restore manager service 114. In some embodiments, the backup restore manager service 134 may verify that the backups 133 exist in the backup data storage 132. The backup restore manager service 134 may collect metadata and location information for the backups 133 requested by the backup restore manager service 114. For example, the backup restore manager service 134 may generate a manifest that includes the metadata and location information for the backups 133. In some embodiments, the backup restore manager service 134 may store the manifest in accordance with an object storage service. For example, the backup restore manager service 134 may request that the object storage service establish a data bucket to provide the manifest to the backup restore manager service 114. The backup restore manager service 114 may then pull the manifest from the data bucket. In other embodiments, the backup restore manager service 134 may send the manifest to the backup restore manager service 114 responsive to the manifest request. For example, the backup restore manager service 134 may push the manifest to the backup restore manager service 114 in response to the manifest request.

The backup restore manager service 114 may initiate one or more import jobs based on the manifest, according to some embodiments. For example, the manifest may indicate one or more locations storing the backups 133 such that an individual import job may be initiated to import a corresponding backup data object of the backups 133. The backups 133 may be stored at the backup data storage 132 in some embodiments. The one or more import jobs may be initiated to retrieve the backups 133 from the backup data storage 132 in accordance with the manifest. The one or more import jobs may require authorization by the backup restore manager service 134 in order to retrieve the backups 133, according to some embodiments.

The services in the second region 120 may initially reject data access requests from services that originate from outside of the second region 120. Similarly, other regions like the first region 101 may reject service calls from outside of those respective regions. The backup restore manager service 114 may send a credential request to the backup restore manager service 134 for bypassing or overriding the initial behavior of rejecting data access for the one or more import jobs. For example, the backup restore manager service 114 may request authorization to retrieve the backups 133 from the second region 120, where the credential request may be formed in accordance with the authentication token. In some embodiments, the credential request may include a signature generated based on the authentication token. In other embodiments, the credential request may include arguments including information determined based on the authentication token. The backup restore manager service 134 may validate the credential request based on determining whether the credential request is authenticated according to the authentication token. For example, the backup restore manager service 134 may call on the credential service 128 to validate that the credential request includes authentication information in accordance with the authentication token.

The backup restore manager service 134 may generate a second region credential based on a determination that the credential request is authenticated, according to some embodiments. The second region credential may identify that service calls have been authorized to be performed in the second region 120 by services that are outside of the second region 120. For example, service calls originating from the first region 101 may be permitted within the second region 120 when the service calls have been generated using the second region credential. In some embodiments, the second region credential may be a copy of a credential usable by the backup restore manager service 134. In other embodiments, the second region credential may include identifying information indicating that the backup restore manager service 134 has authorized the service calls from a given service outside of the second region 120. In additional embodiments, the second region credential may identify that the service calls appear as if they are originating from within the second region 120 despite having an actual origin point of an outside region, such as the first region 101. The backup restore manager service 134 may send the second region credential to the backup restore manager service 114 to generate service calls that are permissible in the second region 120.

The backup restore manager service 114 may send one or more backup requests to the second region 120 to retrieve backups 133 from the backup data storage 132 as part of the one or more import jobs, according to some embodiments. The backup requests may be generated in accordance with the second region credential. For example, the backup requests may have a signature that is generated using the second region credential. As another example, the backup requests may have arguments that are formed based on the second region credential. In some embodiments, the backup requests may include the second region credential as an indication that the backup requests have been authorized by the backup restore manager service 134. In some embodiments, the backup restore manager service 114 may send the backup requests to the backup data storage 132. The backup data storage 132 may validate the backup requests based on determining whether the backup requests include authentication information based on the second region credential. For example, the backup data storage 132 may determine whether the backup requests have a signature indicating that an origin of the backup requests is outside of the second region 120. As another example, the backup data storage 132 may call on the credential service 128 to authenticate the backup requests. The credential service 128 may verify whether the backup requests were generated in accordance with the second region credential. In other embodiments, the backup restore manager service 114 may send the backup requests to the backup restore manager service 134 such that the backup restore manager service 134 may prepare the backups 133 for restoration.

Based on validation of the backup requests, the backup data storage 132 may provide access to the backups 133 to the backup restore manager service 114, according to some embodiments. In some embodiments, the backup data storage 132 may provide direct access to the backups 133 given that the backup requests have been validated. In other embodiments, the backup data storage 132 may establish data buckets in accordance with an object storage service to facilitate access by the backup restore manager service 114. In some embodiments, the backup data storage 132 may send the backups 133 to the backup restore manager service 114 as a push in response to the backup requests. In other embodiments, the backup restore manager service 114 may pull the backups 133 from the data buckets established by the object storage service.

After receiving the backups 133 from the second region 120, the backup restore manager service 114 may determine whether the backups 133 have been encrypted, according to some embodiments. For example, the backups 133 may be encrypted in accordance with the encryption key provided by the credential service 108 that was used to encrypt the authentication token. In another example, the backups 133 may be encrypted in accordance with a client encryption key that is unique to the client. The backup restore manager service 114 may decrypt the backups 133 with an appropriate key based on the determined encryption type. The backup restore manager service 114 may instruct the restore manager 118 to restore the database 111 in accordance with the backups 133. For example, the restore manager 118 may load the backups 133 and write the backups 133 to the database 111.

Figure 2:
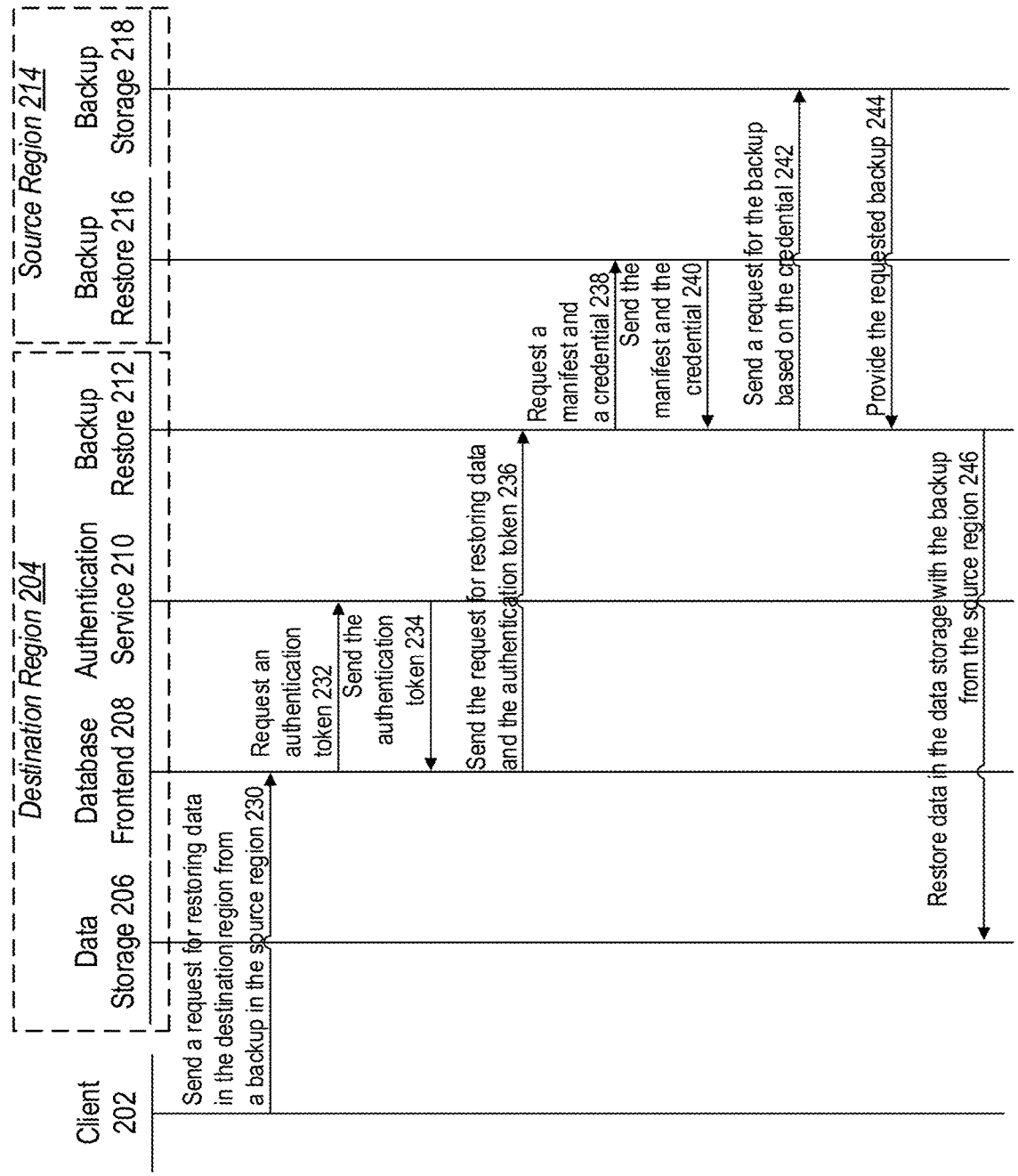
FIG. 2 is a data flow diagram for restoring backups to a database across regions within a data storage system, according to some embodiments.

FIG. 2 illustrates a data flow diagram 200 for transferring data between multiple regions in a data storage system, according to some embodiments. The data storage system may include a client 202, one or more computing devices to implement a data storage 206 and services in a destination region 204, and one or more computing devices to implement services in a source region 214, according to some embodiments. The services in the destination region 204 may include a database frontend 208, an authentication service 210, a backup restore manager service 212, a control plane service 214, and an import service 216. The services in the source region 214 may include a backup restore manager service 216 and a continuous backup service 222. Although the destination region 204 and the source region 214 are depicted as having different combinations of services for the sake of brevity, the destination region 204 and the source region 214 may implement any or all of the services depicted for either region in various embodiments. For example, although not illustrated, the destination region 204 may include a continuous backup service, and the source region 214 may include a control plane service, in some embodiments.

The client 202 may send, to the database frontend 208 of the destination region 204, a request for restoring data 230 in the destination region 204 from the source region 214, according to some embodiments. For example, the client 202 may send, to the database frontend 208, the request 230 restore data in the data storage 206 to a state that is stored in the source region 214. In some embodiments, the database frontend 208 may be a frontend to the data storage system that is accessible via an application programmatic interface (API). For example, the request 230 may be formed and sent by the client 202 in accordance with the API. In some embodiments, the client 202 may send the request for restoring data to a database frontend in a third region. The database frontend in the third region may be configured to receive the request and forward the request to another region for data retrieval of the backup.

The database frontend 208 may send, to the authentication service 210, a request for an authentication token 232, according to some embodiments. The authentication token may alternatively be referred to as a forward access session token. The authentication token may indicate to various services that service calls between the destination region 204 and the source region 214 have been authenticated or authorized for or on behalf of the client 202. In some embodiments, downstream services may be restricted from performing operations on behalf of the client 202 without the authentication token. For example, the downstream services may reject service calls on behalf of the client if the authentication token is not provided as part of the service call. In some embodiments, the authentication service 210 may authenticate the client 202 and generate the authentication token in response to authenticating the client 202. After generating the authentication token, the authentication service 210 may send the authentication token 234 to the database frontend 208.

The database frontend 208 may send a request for restoring data 236 to the backup restore manager service 212, the request generated using the authentication token, according to some embodiments. The database frontend 208 may also encrypt the authentication token in accordance with an encryption key provided by a key management service in some embodiments. In some embodiments, encryption of the authentication token may occur prior to sending the authentication token to a downstream service to protect the authentication token during transmission within the destination region.

The backup restore manager service 212 of the destination region 204 may send, to the backup restore manager service 216 of the source region 214, a manifest request 238 for the requested data, according to some embodiments. In some embodiments, the manifest request 238 may be generated in accordance with the authentication token to indicate to the backup restore manager service 216 that the service call is performed on behalf of the client 202. In some embodiments, the backup restore manager service 216 may prepare a manifest that indicates locations of backup data objects to be used for data restoration. The manifest may be sent in response to the manifest request 238. In some embodiments, the manifest may be provided in accordance with an object storage service provided by the source region 214. For example, the object storage service may provide data buckets that are accessible to the backup restore manager service 216 to facilitate data transfers between various services.

The manifest request 238 may also include a credential request, in some embodiments. In some embodiments, the credential request may include a signature generated in accordance with the authentication token to validate that the credential request originated from a region that is authorized to make service calls to the backup restore manager service 216 on behalf of the client 202. The backup restore manager service 216 may determine whether the backup restore manager service 212 has permissions to perform service calls on behalf the client 202 between regions based on determining whether the signature is signed in accordance with the authentication token. In some embodiments, the backup restore manager service 216 may call an authentication service in the source region 214 to authenticate the signature. The backup restore manager service 216 may assume a role with permissions to get the snapshot data and associated snapshot data objects from the object storage service, according to some embodiments. In some embodiments, the backup restore manager service 216 may assume an encryption-at-rest role in a request router service within the source region 214. The encryption-at-rest role may allow decryption access to an encryption key to be used for a decryption action.

In response to the credential request, the backup restore manager service 216 may send, to the backup restore manager service 212, the credentials 240, according to some embodiments. The credentials, when used as part of a service call, may indicate to services in the source region 214 that the service call effectively originates from within the source region 214 even if the actual origination point is outside of the source region 214, such as the destination region 204. The backup restore manager service 212 may send, to the backup storage 218, a request for the backup 242, the request being generated using the source region credential. The source region 214 may be configured to reject requests for data that do not satisfy certain security requirements. For example, the backup storage 218 may reject requests that originate outside of the source region 214. As another example, the backup storage 218 may permit requests that originate outside of the source region 214 provided that a signature included in the requests identify a role that is allowed to access the data. In another example, the credentials may be applied to requests to cause the requests to appear as if they originate from within the source region 214.

The backup storage 218 may provide access to the requested backup 244 based on validation of the source region credential. In some embodiments, the backup restore manager service 212 may retrieve backup data objects from the backup storage 218. In other embodiments, the backup storage 218 may send the backup data objects in response to the request from the backup restore manager service 212.

The backup restore manager service 212 may then store the backup data objects to the database in the data storage 206. In some embodiments, storing the backup data objects may cause the data in the data storage to be reverted to a previous point-in-time. In some embodiments, the backup restore manager service 212 may decrypt the backup data objects prior to restoring the database in the data storage 206 in accordance with an encryption key provided by a key management service.

Figure 3:
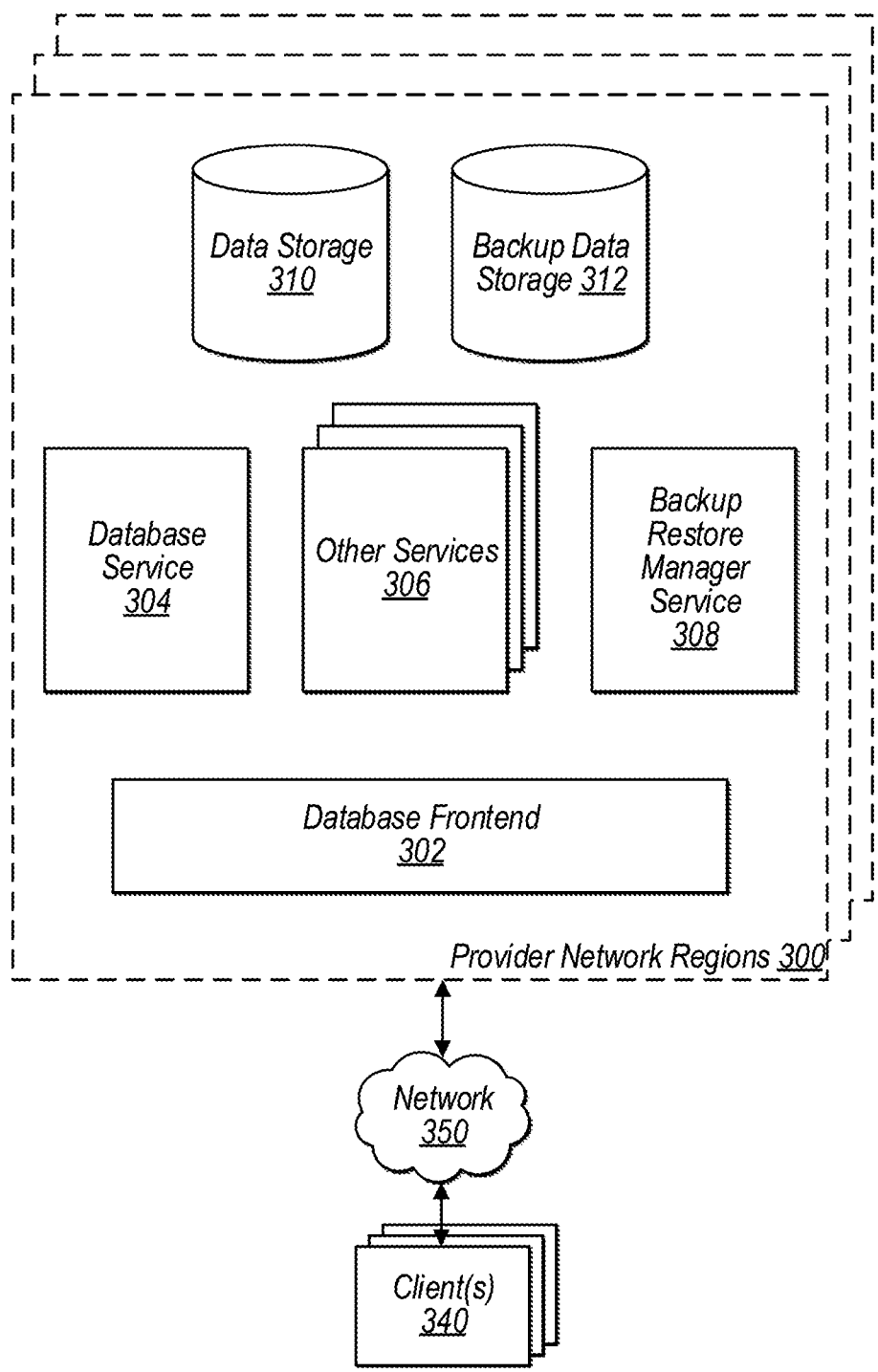
FIG. 3 is a block diagram for a provider network having multiple regions to provide a database service, according to some embodiments.

FIG. 3 is a block diagram illustrating a provider network having a plurality of provider network regions 300 configured to provide various services to clients 340 via a network 350. In some embodiments, the provider network regions 300 may provide a database service 304, a backup restore manager service 208, and other services 306. The provider network regions 300 may include data storage 310 to store data relating to databases managed by the database service 304 and backup data storage 312 to maintain backups of the databases stored in the data storage 310.

The clients 340 may interface with the database service 304 via a database frontend 302, according to some embodiments. For example, the database frontend 302 may be a service with a client-facing API that allows the clients 340 to submit requests to restore data in the data storage 310 with backup data stored in the backup data storage 312. The database frontend 302 may allow the clients 340 to specify particular ones of the provider network regions 300 which have the database to be restored and particular other ones of the provider network regions 300 which have the backups to restore the database. For example, the clients 340 may specify a destination region, a target database table, and a source region from which backups are to be retrieved.

The provider network regions 300 may provide other services 306 to the clients 340 or to the database service 304 and the backup restore manager service 308. For example, the other services 306 may include an authentication service that generates authentication tokens to indicate that service calls have been authorized to be performed on behalf of the clients 340. As another example, the other services 306 may include a credential service configured to validate the authentication tokens or other credentials used in restoring backups of databases.

The provider network regions 300 may be initially configured to reject service calls that are sent between the provider network regions 300. For example, a first provider network region may reject service calls originating from a second provider network region. The backup restore manager service 308 may provide an in-region credential to an out-of-region service such that other services within the region may consider that the out-of-region service has been authenticated to issue service calls within the region.

Figure 4:
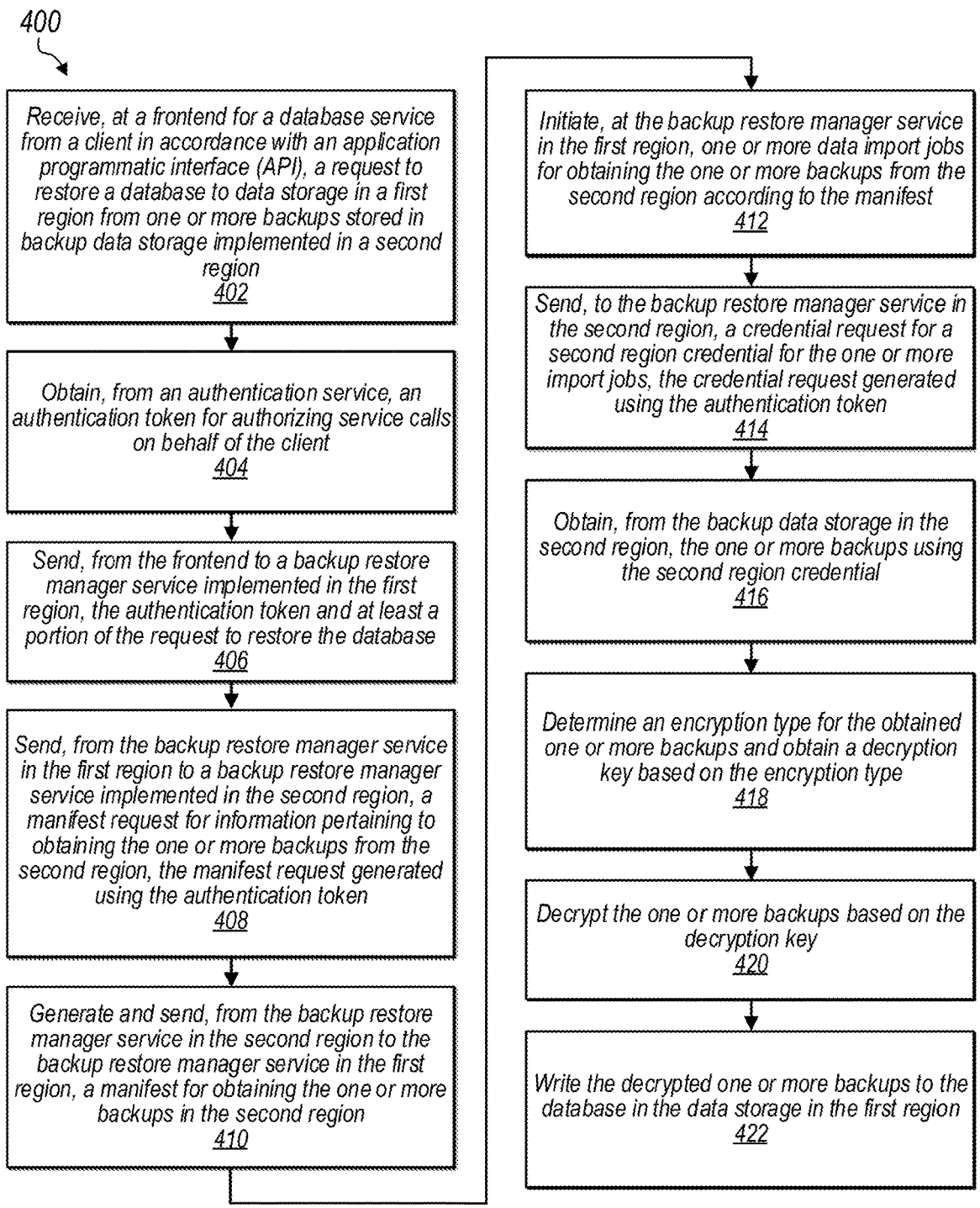
FIG. 4 is a flowchart diagram for restoring backups to a database across regions within a data storage system, according to some embodiments.

FIG. 4 is a flowchart diagram of a method 400 for a cross-region restoration of a database, according to some embodiments. The method 400 may be performed by one or more computing devices implemented across a data storage system, according to some embodiments. At least some of the computing devices may be implemented for respective regions of a multi-region provider network.

The method 400 may include receiving, at a frontend for a database service from a client in accordance with an application programmatic interface (API), a request to restore a database to data storage in a first region from one or more backups stored in a backup data storage implemented in a second region, at 402. The frontend may correspond to the database frontend 104 or the database frontend 124 of FIG. 1, the database frontend 208 of FIG. 2, or the database frontend 302 of FIG. 3, according to some embodiments. The first region may correspond to the first region 101 of FIG. 1 or the destination region 204 of FIG. 2. The second region may correspond to the second region 120 of FIG. 1 or the source region 214 of FIG. 2. In some embodiments, the designations of first or second and destination or source may be reversed based on which particular region is to have data restored. The frontend may receive client requests to be passed on to the database service. The frontend may also initiate service calls to other services to obtain additional information to support the database service.

The method 400 may also include obtaining, from an authentication service, an authentication token for authorizing service calls on behalf of the client, at 404. The authentication service may correspond to the authentication service 106, the authentication service 126 of FIG. 1 or the authentication service 210 of FIG. 2, according to some embodiments. The authentication service may also be included as part of the other services 304 of FIG. 3 in some embodiments. The frontend may be configured to send a request for the authentication to the authentication service. The request may include an indication of the client in order to determine whether other services may initiate service calls on behalf of the client.

The method 400 may include sending, from the frontend to a backup restore manager service implemented in the first region, the authentication token and at least a portion of the request to restore the database, at 406. The backup restore manager service in the first region may correspond to the backup restore manager service 114, the backup restore manager service 212, or the backup restore manager service 308, according to some embodiments. The frontend may provide information to the backup restore manager service that may facilitate restoration of a database backup across regions by the backup restore manager service. For example, the backup restore manager service may generate service calls to other services using the authentication token.

The method 400 may include sending, from the backup restore manager service in the first region to a backup restore manager service implemented in the second region, a manifest request for information pertaining to obtaining the one or more backups from the second region, the manifest request generated using the authentication token, at 408. The backup restore manager service in the second region may correspond to the backup restore manager service 134, the backup restore manager service 216, or the backup restore manager service 308, according to some embodiments. The backup restore manager service in the first region may seek information indicating locations of the one or more backups within the second region. For example, the locations may indicate endpoints from which backup data objects may be retrieved.

The method 400 may further include generating and sending, from the backup restore manager service in the second region to the backup restore manager service in the first region, a manifest for obtaining the one or more backups in the second region, at 410. The backup restore manager service in the first region may receive the manifest indicating locations of the one or more backups to facilitate retrieval of the one or more backups from the second region. In some embodiments, the manifest may include additional metadata regarding the backups.

The method 400 may also include initiating, at the backup restore manager service in the first region, one or more data import jobs for obtaining the one or more backups from the second region according to the manifest, at 412. In some embodiments, the backup restore manager service may initiate the data import jobs based on a quantity of backups to be retrieved from the second service. For example, individual ones of the data import jobs may correspond to individual ones of the backups on the second service. The import jobs may indicate respective locations to retrieve the backups based on the manifest.

The method 400 may further include sending, to the backup restore manager service in the second region, a credential request for a second region credential for the one or more import jobs, the credential request generated using the authentication token, at 414. The credential request may include a signature generated in accordance with the authentication token. In other embodiments, the credential request may include the authentication token. For example, the credential request may include information indicating that the authentication token was applied to the credential request. In other embodiments, the backup restore manager service in the second region may send a copy of credentials usable by the backup restore manager service in the second region.

The method 400 may also include obtaining, from the backup data storage in the second region, the one or more backups using the second region credential, at 416. In some embodiments, the backup restore manager service in the first region may send requests to the locations in the backup data storage that store backup data objects indicated in the manifest. The backup data storage may reject service calls from the backup restore manager service based on a determination that the requests are not authenticated according to the second region credential. In some embodiments, the second region credential may be applied to the requests such that the requests appear as if they originate from within the second region to the backup data storage.

The method 400 may include determining an encryption type for the obtained one or more backups and obtain a decryption key based on the encryption type, at 418. In some embodiments, the one or more backups may be encrypted when stored in the backup data storage. For example, the one or more backups may be stored under encryption to prevent other clients or the services from accessing the data within the one or more backups without authorization. In some embodiments, the encryption may be a default encryption that is based on an encryption key provided by the database service. In other embodiments, the encryption may be a client-managed encryption, where an encryption key may be managed by the client or by a key management service accessible by the client.

The method 400 may also include decrypting the one or more backups based on the decryption key, at 420. In some embodiments, decrypting the one or more backups may be performed by the backup restore manager service. In other embodiments, a cryptography service may be configured to decrypt the one or more backups.

The method 400 may conclude by writing the decrypted one or more backups to the database in the data storage in the first region, at 422. The decrypted one or more backups may be stored to the database in an unencrypted form to allow the client to access the restored database.

Figure 5:
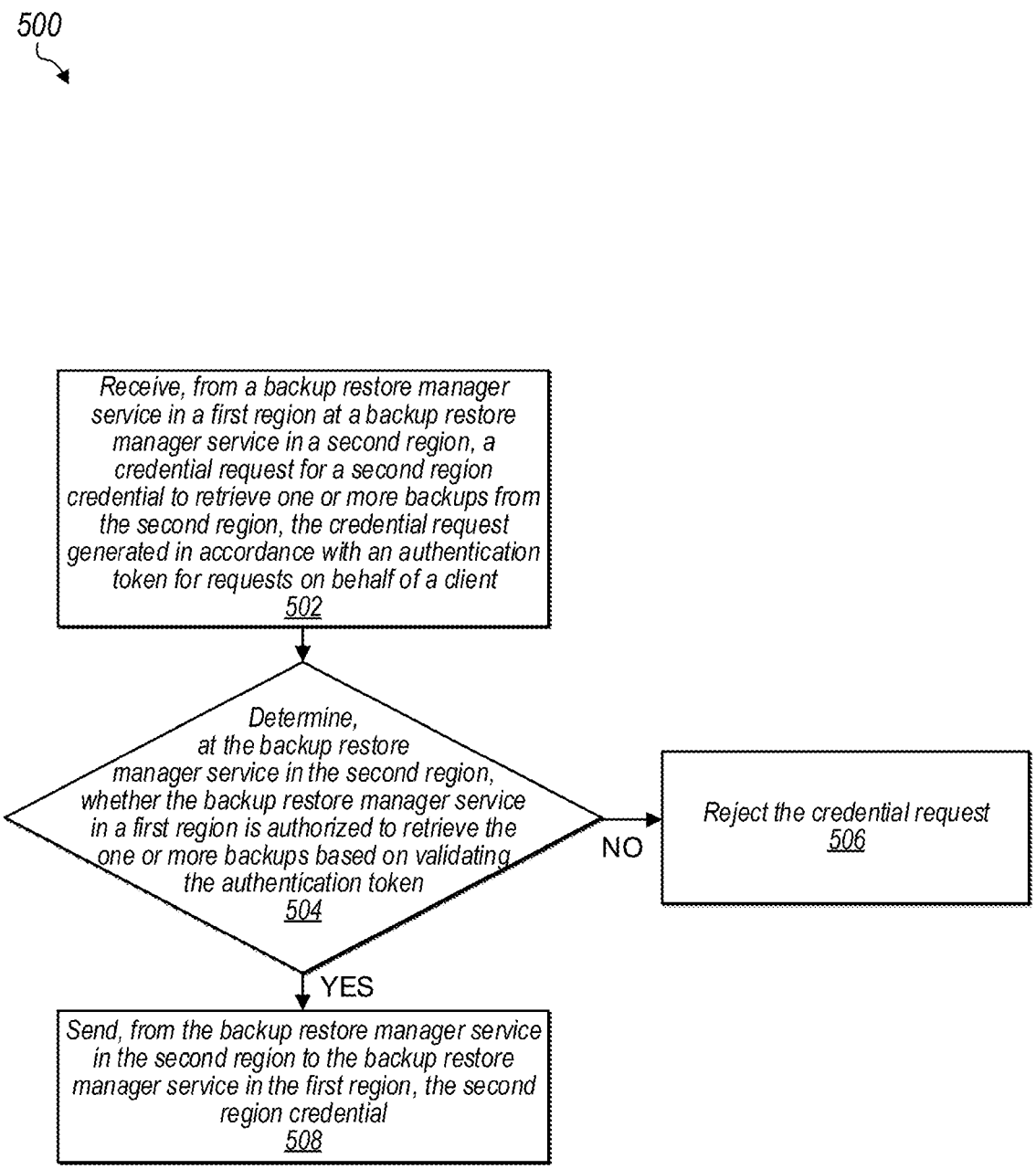
FIG. 5 is a flowchart diagram for providing a credential across regions, according to some embodiments.

FIG. 5 illustrates a method 500 for providing credentials to a service in another region, according to some embodiments. The method 500 may be performed by a backup restore manager, such as the backup restore manager service 134 of FIG. 1, the backup restore manager service 216 of FIG. 2, or the backup restore manager service 308 of FIG. 3, according to some embodiments.

The method 500 may include receiving, from a backup restore manager service in a first region at a backup restore manager service in a second region, a credential request for a second region credential to retrieve one or more backups from the second region, the credential request generated in accordance with an authentication token for requests on behalf of a client, at 502. The backup restore manager service in the first region may correspond to the backup restore manager service 114, the backup restore manager service 212, or the backup restore manager service 308, according to some embodiments. The backup restore manager service in the second region may correspond to the backup restore manager service 134, the backup restore manager service 216, or the backup restore manager service 308, according to some embodiments. The backup restore manager service in the first region may send the credential request to authorize subsequent service calls, such as backup requests, as described herein. The authentication token may authorize the client of make service calls within the first region and the second region.

The method 500 may also include determining, at the backup restore manager service in the second region, whether the backup restore manager service in a first region is authorized to retrieve the one or more backups based on validating the authentication token, at 504. In some embodiments, the backup restore manager service may generate a service call to a credential service, such as credential service 128 of FIG. 1, to validate that the authentication was used in generating the credential request. In other embodiments, the backup restore manager service may identify a signature in the credential request to determine whether the signature has been formed in accordance with the authentication token. Based on a determination that the backup restore manager service in the first region is not authorized, the method 500 may continue onto 506. Based on a determination that the backup restore manager service in the first region is authorized, the method 500 may continue onto 508. In some embodiments, the authorization token may indicate to the backup restore manager service in the second region that the client is permitted to make service calls in both the first region and the second region. In other embodiments, the authorization token may indicate that the client is a driver of the service calls rather than an operator within the second region.

The method 500 may also include, based on a determination that the backup restore manager service in the first region is not authorized, rejecting the credential request, at 506. The backup restore manager service in the second region may decline sending a credential in response to the credential request when the authentication token has not been validated.

The method 500 may further include, based on a determination that the backup restore manager service in the first region is authorized, sending, from the backup restore manager service in the second region to the backup restore manager service in the first region, the second region credential, at 508. In some embodiments, the backup restore manager service in the second region may generate the second region credential to be sent to the backup restore manager service in the first region. In other embodiments, the backup restore manager service in the second region may send a copy of credentials used by the backup restore manager service in the second region.

Figure 6:
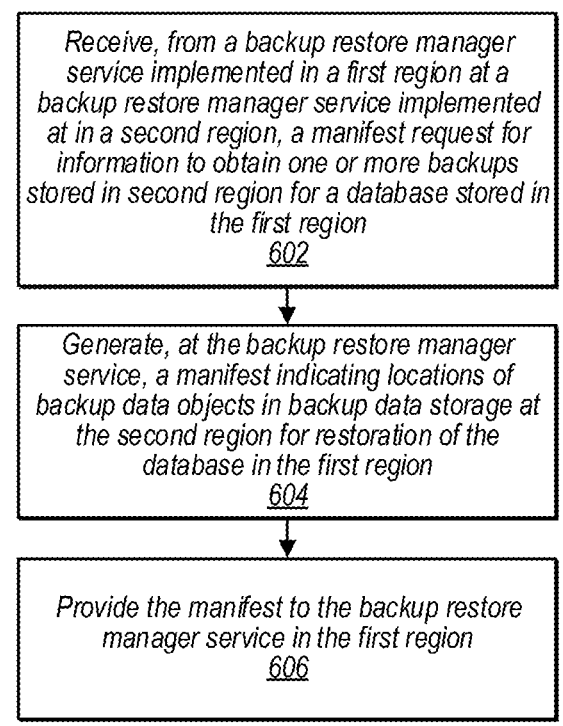
FIG. 6 is a flowchart diagram for providing a manifest for obtaining backups stored across regions, according to some embodiments.

FIG. 6 is a flowchart diagram of a method 600 of a backup restore manager service providing a manifest to another backup restore manager service in a different region. The method 600 may be implemented by a backup restore manager service, such as the backup restore manager service 134 of FIG. 1, the backup restore manager service 216 of FIG. 2, or the backup restore manager service 308 of FIG. 3, according to some embodiments.

The method 600 may include receiving, from a backup restore manager service implemented in a first region at a backup restore manager service implemented at in a second region, a manifest request for information to obtain one or more backups stored in second region for a database stored in the first region, at 602. The backup restore manager service in the first region may correspond to the backup restore manager service 114, the backup restore manager service 212, or the backup restore manager service 308, according to some embodiments. The backup restore manager service in the first region may use the information to identify locations of the one or more backups in the second region.

The method 600 may include generating, at the backup restore manager service in the second region, a manifest indicating locations of backup data objects in a backup data storage at the second region for restoration of the database in the first region, at 604. In some embodiments, the manifest may include endpoint information identifying endpoints that may be used to retrieve the backup data objects. In other embodiments, the manifest may include locations within backup data storage of the second region which may be used by the backup restore manager service in the first region.

The method 600 may include providing the manifest to the backup restore manager service in the first region, at 606. In some embodiments, the manifest may be stored to a data bucket provided by an object storage service implemented in the second region. The backup restore manager service in the first region may retrieve the manifest from the data bucket as a pull request. In other embodiments, the manifest may be sent to the backup restore manager service in the first region in response to the manifest request.

Figure 7:
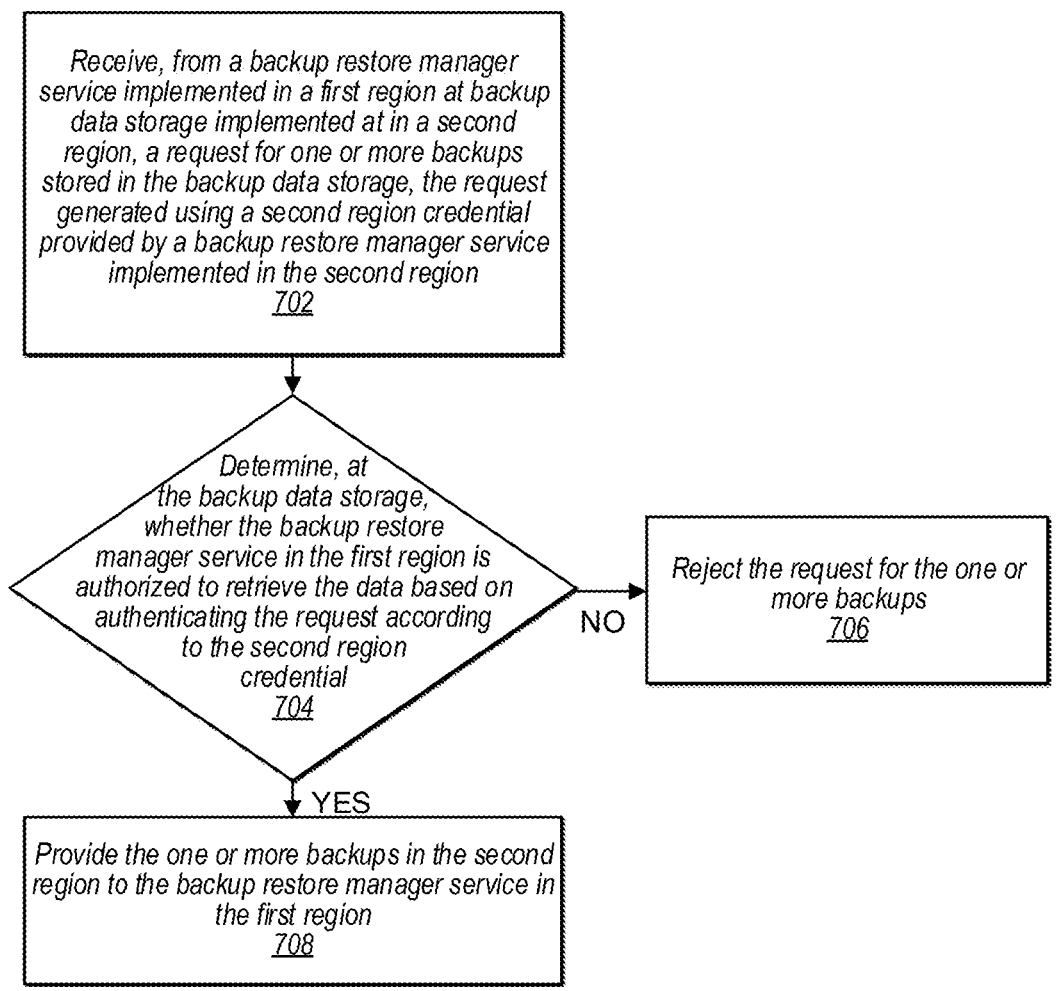
FIG. 7 is a flowchart diagram for authenticating requests for backups across regions, according to some embodiments

FIG. 7 is a flowchart diagram illustrating a method 700 for a backup restore manager service providing backups to another backup restore manager service in a different region, according to some embodiments. The method 700 may be implemented by a backup restore manager service, such as the backup restore manager service 134 of FIG. 1, the backup restore manager service 216 of FIG. 2, or the backup restore manager service 308 of FIG. 3, according to some embodiments.

The method 700 may include receiving, from a backup restore manager service implemented in a first region at a backup data storage implemented at in a second region, a request for one or more backups stored in the backup data storage, the request generated using a second region credential provided by a backup restore manager service implemented in the second region, at 702. The backup restore manager service in the first region may correspond to the backup restore manager service 114, the backup restore manager service 212, or the backup restore manager service 308, according to some embodiments. The one or more backups may include backups of a database stored in the first region. The second region credential be provided to the backup restore manager in the first region as described with respect to the method 500 of FIG. 5.

The method 700 may include determining, at the backup data storage, whether the backup restore manager service in the first region is authorized to retrieve the data based on authenticating the request according to the second region credential, at 704. In some embodiments, the backup data storage may reject requests that appear to originate from outside of the second region. The backup data storage may allow some requests to be fulfilled based on a secondary determination as to whether the requests have been authorized by the backup restore manager service in the second region based on the second region credential. As described herein, the backup data storage may verify, using a credential service, that the request has been properly signed in accordance with the second region credential. Based on a determination that the backup restore manager service in the first region is not authorized, the method may continue onto 706. Based on a determination that the backup restore manager service in the first region is authorized, the method may continue onto 708.

The method 700 may include, based on a determination that the backup restore manager service in the first region is not authorized, rejecting the request for the one or more backups, at 706. The backup data storage may terminate the request by declining to fulfill the request when the backup restore manager service in the first region is unable to prove that the request has been authorized.

The method 700 may include, based on a determination that the backup restore manager service in the first region is authorized, providing the one or more backups in the second region to the backup restore manager service in the first region, at 708. In some embodiments, the one or more backups may be transferred to a data bucket established by an object storage service. In other embodiments, the backup restore manager service in the second region may send the one or more backups responsive to the request in a push response.

Figure 8:
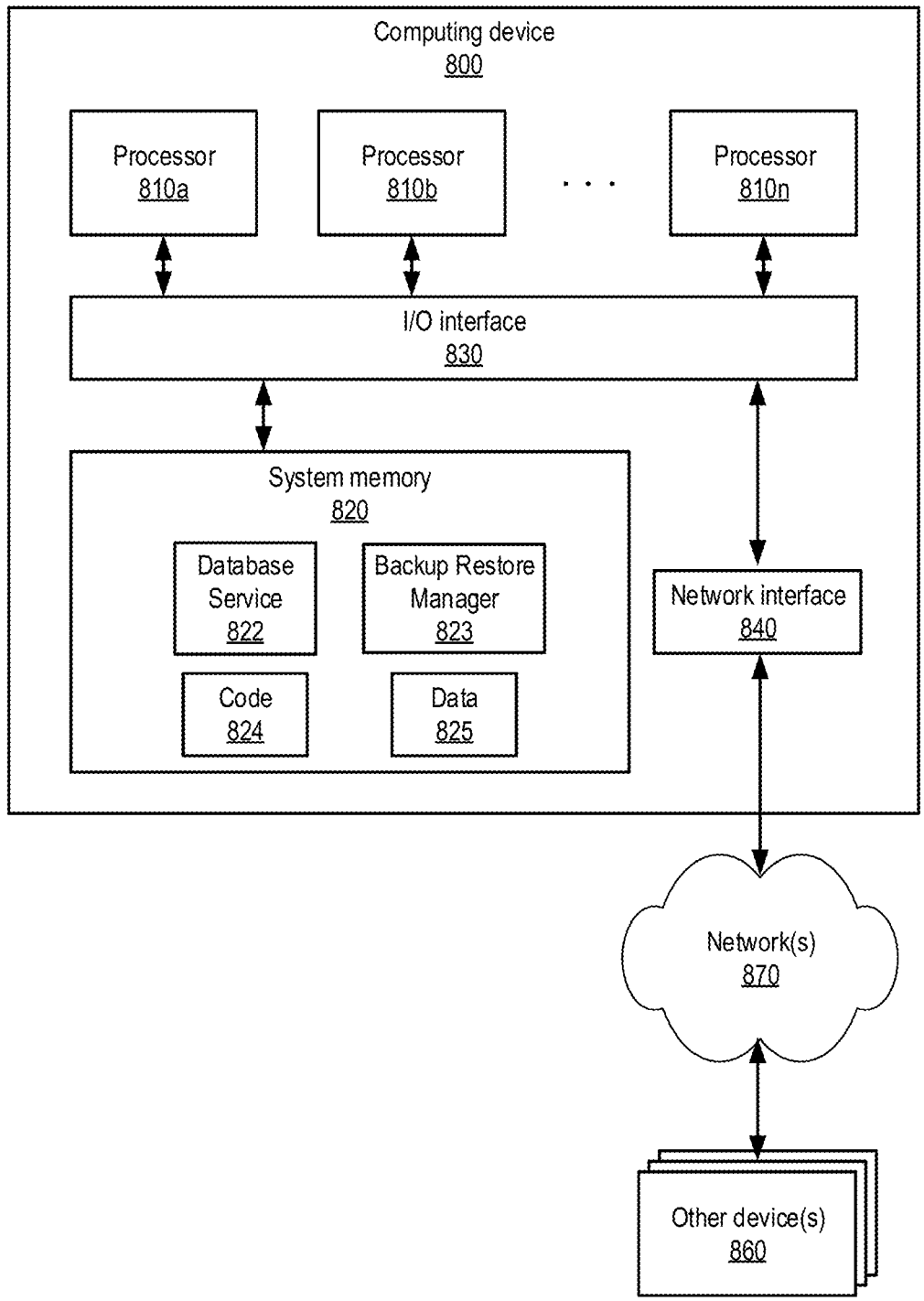
FIG. 8 is a block diagram illustrating an example computer system that may be used in some embodiments.

Any of various computer systems may be configured to implement techniques for managing memory compression in a secure manner, as disclosed herein. For example, FIG. 8 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 820 as program instructions 824. In some embodiments, system memory 820 may include data 825 which may be configured as described herein. In some embodiments, system memory 820 may include database service 822. For example, database service 822 may perform the functions of database service 102 of the first region 101 of FIG. 1. As an alternative example, database service 822 may perform the functions of database service 122 of the second region 120 of FIG. 1. In some embodiments, system memory 820 may include backup restore manager 823. For example, backup restore manager 823 may perform the functions of the backup restore manager service 114, the backup restore manager service 134 of FIG. 1 or the backup restore manager 212 of FIG. 2.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between client devices (e.g., 860, etc.) and other computer systems, or among hosts, for example. In particular, network interface 840 may be configured to allow communication between computer system 800 and/or various other devices 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks 870, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, which may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    data storage in a first region for a database service configured to store a plurality of database objects;
    backup data storage in the first region configured to store one or more backups of the individual ones of the database objects;
    one or more computing devices comprising one or more processors and memory and configured to implement a frontend for the database service configured to:
        receive, from a client in accordance with an application programmatic interface (API), a request to restore a database to the first region from one or more other backups stored in another backup data storage implemented in a second region; and
        request and receive, from an authentication service, an authentication token for the request from the client; and
    one or more computing devices comprising one or more processors and memory and configured to implement a backup restore manager service for the first region configured to:
        perform backup operations to store the one or more backups of individual ones of the database objects to the backup data storage in the first region;
        send, from the backup restore manager service for the first region to another backup restore manager service implemented in the second region, a credential request for a second region credential authorizing the backup restore manager service for the first region to retrieve the one or more other backups from the second region, wherein the credential request is generated using the authentication token;
        receive, by the backup restore manager service for the first region from the other backup restore manager service, the second region credential;
        send, from the backup restore manager service for the first region to the other backup data storage in the second region, a backup restore request to retrieve the one or more other backups from the other backup data storage in the second region, wherein the backup restore request is generated using the second region credential; and
        load, by the backup restore manager service for the first region, the one or more backups from the second region to restore the database.

2. The system of claim 1, further comprising:
    one or more computing devices comprising one or more processors and memory and configured to implement the other backup restore manager service configured to:

receive, from the backup restore manager service in the first region, the credential request for the second region credential;

determine whether the credential request is authorized based at least in part on validating that the credential request was generated using the authentication token; and based on a determination that the credential request is authorized, send, to the backup restore manager service, the second region credential.

3. The system of claim 2, further comprising:

the other backup data storage in the second region for the database service configured to:

store the one or more other backups of the individual ones of the database objects;

receive, from the backup restore manager service of the first region, the backup retrieval request generated using the second region credential;

determine whether the backup retrieval request includes a credential for services originating from within the second region; and based on a determination that the second region credential originated from within the second region, send, to the backup restore manager service of the first region the one or more backups.

4. The system of claim 1, wherein the backup restore manager service of the first region is further configured to:

send, to the other backup restore manager service of the second region, a manifest request for location information of backup data objects for the backup in the second region, wherein the manifest request is generated using the authentication token; and receive, from the backup restore manager service of the second region, the location information.

5. The system of claim 1, further comprising:

one or more computing devices comprising one or more processors and memory and configured to implement the authentication service configured to:

receive, from the frontend, a request for the authentication token;

generate the authentication token to authorize service calls on behalf the client; and send, to the frontend, the authentication token.

6. A method, comprising:

receiving, from a client of a database service in accordance with an application programmatic interface (API), a request to restore a database to data storage of a first region from one or more backups stored in a backup data storage implemented in a second region;

requesting and receiving, from an authentication service, an authentication token for the request from the client;

sending, from a backup restore manager service implemented in the first region to another backup restore manager service implemented in the second region, a credential request for a second region credential authorizing the backup restore manager service for the first region to retrieve the one or more backups from the second region, wherein the credential request is generated using the authentication token;

receiving, from the other backup restore manager service implemented in the second region, the second region credential;

sending, from a backup restore manager service implemented in the first region to the backup data storage in the second region, a backup restore request to retrieve the one or more backups from the backup data storage in the second region, wherein the backup restore request is generated using the second region credential; and loading the one or more backups from the second region to restore the database.

7. The method of claim 6, further comprising:

receiving, at the authentication service from a frontend of the database service, a request for the authentication token;

generating, at the authentication service, the authentication token to authorize service calls on behalf the client; and sending, from the authentication service to the frontend, the authentication token.

8. The method of claim 6, further comprising:

sending, to the other backup restore manager service of the second region, a manifest request for a manifest indicating location information of the one or more backups in the second region, wherein the manifest request is generated using the authentication token; and receiving, from the other backup restore manager service of the second region, the manifest.

9. The method of claim 8, further comprising:

initiating, based at least in part on the manifest, one or more import jobs for retrieving the one or more backups from the backup data storage in the second region.

10. The method of claim 6, further comprising:

performing backup operations to store one or more local backups of the database to a backup data storage in the first region.

11. The method of claim 6, further comprising:

encrypting the authentication token according to an encryption key provided by a key management service.

12. The method of claim 6, further comprising:

determining an encryption type for the one or more backups; and obtaining a decryption key based on the decryption type.

13. The method of claim 12, further comprising:

decrypting the one or more backups based at least in part on the decryption key.

14. One or more non-transitory, computer-readable storage media storing instructions that, when executed on or across one or more processors, cause the one or more processors to:

in response to a request, received from a client of a database service in accordance with an application programmatic interface (API), to restore a database to a first region from one or more backups stored in a backup data storage implemented in a second region, request, from an authentication service, an authentication token for the request from the client;

send, from a backup restore manager service implemented in the first region to another backup restore manager service implemented in the second region, a credential request for a second region credential authorizing the backup restore manager service to retrieve the one or more backups from the second region, wherein the credential request is generated using the authentication token;

send, from the backup restore manager service in the first region to the backup data storage in the second region, a backup restore request to retrieve the one or more backups from the backup data storage in the second region, wherein the backup restore request is generated using the second region credential received from the backup restore manager service implemented in the second region; and load the one or more backups from the second region to restore the database.

15. The one or more non-transitory, computer-readable storage media of claim 14, further comprising instructions that, when executed on or across one or more processors, cause the one or more processors to:

in response to receiving a request for the authentication token, generate the authentication token to authorize service calls on behalf the client; and send, to the backup restore manager service, the authentication token.

16. The one or more non-transitory, computer-readable storage media of claim 14, further comprising instructions that, when executed on or across one or more processors, cause the one or more processors to:

send, to the other backup restore manager service of the second region, a manifest request for a manifest indicating location information of the one or more backups in the second region, wherein the manifest request is generated using the authentication token; and receive, from the other backup restore manager service of the second region, the manifest.

17. The one or more non-transitory, computer-readable storage media of claim 16, further comprising instructions that, when executed on or across one or more processors, cause the one or more processors to:

initiate, based at least in part on the manifest, one or more import jobs for retrieving the one or more backups from the backup data storage in the second region.

18. The one or more non-transitory, computer-readable storage media of claim 14, further comprising instructions that, when executed on or across one or more processors, cause the one or more processors to:

perform backup operations to store one or more local backups of the database to a backup data storage in the first region.

19. The one or more non-transitory, computer-readable storage media of claim 14, further comprising instructions that, when executed on or across one or more processors, cause the one or more processors to:

encrypt the authentication token according to an encryption key provided by a key management service.

20. The one or more non-transitory, computer-readable storage media of claim 14, further comprising instructions that, when executed on or across one or more processors, cause the one or more processors to:

determine an encryption type for the one or more backups; and obtain a decryption key based on the decryption type; and decrypt the one or more backups based at least in part on the decryption key.

* * * * *